(12) United States Patent
Risley

(10) Patent No.: US 9,885,198 B1
(45) Date of Patent: Feb. 6, 2018

(54) FENCE BOARD INSTALLATION AID

(71) Applicant: Jimmy R. Risley, Ocklawaha, FL (US)

(72) Inventor: Jimmy R. Risley, Ocklawaha, FL (US)

( * ) Notice: Subject to any disclaimer, the term of this patent is extended or adjusted under 35 U.S.C. 154(b) by 0 days.

(21) Appl. No.: 15/430,512

(22) Filed: Feb. 12, 2017

(51) Int. Cl.
| | |
|---|---|
| *E04H 17/26* | (2006.01) |
| *G01B 3/00* | (2006.01) |
| *G01B 3/04* | (2006.01) |
| *G01B 3/08* | (2006.01) |
| *G01B 3/30* | (2006.01) |

(52) U.S. Cl.
CPC .............. *E04H 17/26* (2013.01); *G01B 3/002* (2013.01); *G01B 3/04* (2013.01); *G01B 3/08* (2013.01); *G01B 3/30* (2013.01)

(58) Field of Classification Search
CPC .............. E04H 17/26; G01B 3/08; G01B 3/30
USPC .................................... 33/712, 1 G, 646–649
See application file for complete search history.

(56) References Cited

U.S. PATENT DOCUMENTS

| | | | | | |
|---|---|---|---|---|---|
| 92,563 | A * | 7/1869 | Barns | .................. | E04F 21/1855 33/646 |
| 473,098 | A * | 4/1892 | Underwood | ........ | E04F 21/1855 33/646 |
| 1,598,986 | A * | 9/1926 | Ping | .................... | E04F 21/1855 33/647 |
| 4,473,100 | A * | 9/1984 | Wheeler | ............. | E04F 21/1855 33/647 |
| 4,936,021 | A * | 6/1990 | Frenette | .................... | G01B 3/30 269/37 |
| 5,094,007 | A * | 3/1992 | Gordon | ................. | E04D 15/025 33/646 |
| 5,692,311 | A * | 12/1997 | Paquin | ................ | E04F 21/1855 33/647 |
| 6,705,021 | B2 * | 3/2004 | Nadal | ................. | E04F 21/1855 33/411 |
| 7,546,692 | B2 * | 6/2009 | Simko | ................. | E04F 21/1855 33/613 |
| 8,656,603 | B1 * | 2/2014 | Rush | ................... | E04F 21/1855 33/613 |
| 2004/0020066 | A1 * | 2/2004 | Morey | ................ | E04F 21/1855 33/647 |
| 2008/0301966 | A1 * | 12/2008 | Walther | ............. | E04F 13/0864 33/649 |

\* cited by examiner

*Primary Examiner* — Christopher Fulton
(74) *Attorney, Agent, or Firm* — Massinger Law Offices

(57) ABSTRACT

An apparatus for facilitating the rapid mounting of fence boards to fence posts includes a rail having a tongue projecting perpendicularly from one end thereof; and a board support assembly slidably disposed on the rail, the board support assembly including a carriage slidably mounted on the rail, a carriage lock for selectively fixing the carriage at a desired location along the rail, and a hook depending from the carriage below the tongue for temporarily supporting one end of a board to be mounted to a post. The subject apparatus may be hung from a first fence board by the tongue and then used to support an end of a second fence board within the cradle a desired distance below, and in substantially coplanar alignment with, the first board for mounting to a post.

20 Claims, 9 Drawing Sheets

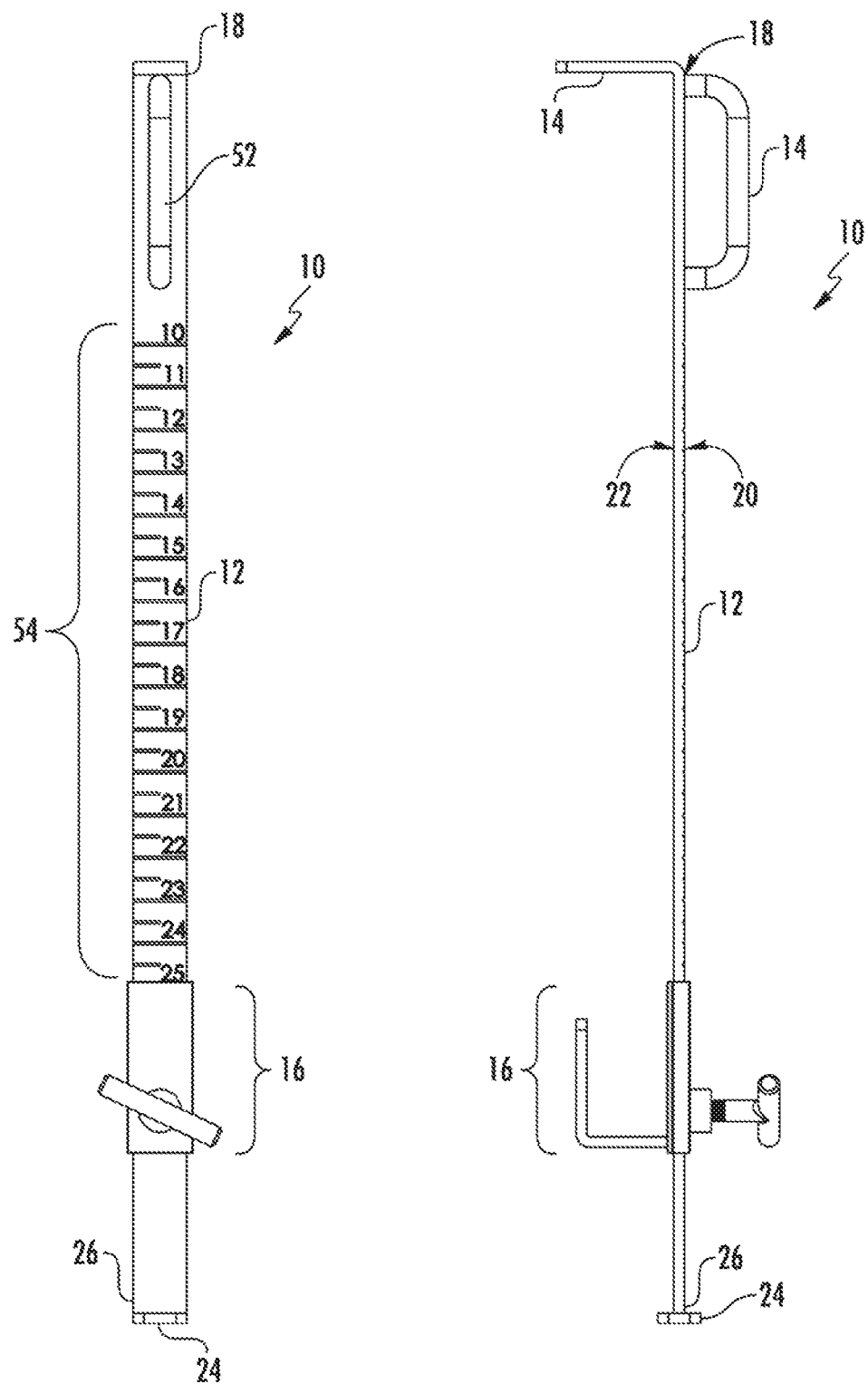

FENCE BOARD INSTALLATION AID

FIELD OF THE INVENTION

The present invention pertains generally to the construction of post and board style fencing, and more particularly to an apparatus for facilitating the mounting of horizontal fence boards to posts.

BACKGROUND OF THE INVENTION

Post and board style fence or "fencing", also referred to as "post and rail fence" or more simply, "board fence, is constructed of widely spaced square or round posts which support several spaced horizontal boards. This style of fence has been around since the early 1700s and is popular for a variety of reasons not the least of which are its refined appearance, efficient use of lumber and ease in conforming to slopes and rolling ground.

Post and board fencing is commonly used in both suburban and agricultural settings. In suburban settings, board fence is desired for its rural look, neat appearance, charm and structural integrity, and is commonly accepted, if not mandated, by many home owner associations ("HOA's") perhaps for these reasons. Traditional agricultural versions of post and board fences typically include three to five boards spaced evenly apart or as needed to contain livestock. When a more complete barrier is needed such as for containing pets or preventing entry of unwanted animals, the back side of the fence may be covered with galvanized wire fencing, which is relatively unnoticeable behind the bold lines of the fence boards.

Despite their popularity and ease of installation relative to some other fence types, the erection of post and board fencing remains a laborious and time intensive task. This time and effort is dramatically increased when only one person is performing the installation. Of difficulty in such instances is the task of hanging the fence boards which are often sixteen feet long and span three posts. Because of their length, it is impossible for an individual to hold one end of the board in place while simultaneously fastening the opposite end to a post. A first workaround is to rest one end of the board on the ground in proximity to the post to which it will be mounted and then tacking the opposite end to its post. Because the board is held in a horizontal orientation while tacking the first end, it is not possible to achieve a tight abutting fit with the adjacent board using this method. Another common workaround is to cradle the board near its midpoint with one arm, position and hold one end of the board against the post to which it will be attached, and then tack the board at its midpoint to the center post. This is no simple task when considering that the individual must also hold and position the fastener in its proper position with one hand while driving fastener with the opposite hand, both while cradling the board. Yet another workaround is to temporarily clamp one of the board against the post to which it will be mounted using some sort of clamping device. This method also necessitates leaving the opposite end of the board on the ground during the clamping operation. Once the clamped end of the board is in place, the opposite end is lifted to properly position it for mounting; this action unfortunately often causes the clamped end to slip out of place as the board is rotated into position. In a similar method, instead of using a clamp, one end of the board is tied to either the post or an adjacent board using string or wire. Of course, the string or wire must be repeatedly tied and untied for each board which can be tedious and time consuming. Each of the above methods and their associated shortcomings may be encountered during a new fence installation or during the replacement of a single board which has been damaged as is all too often the case with board fence used for horse or cattle containment.

Given that virtually all board fence installations involve the mounting of numerous boards, in some cases in the hundreds or even thousands, and given further the significant cost in time and labor associated with such installations, and given still further the difficulty associated with even a single fence board replacement when only one person is performing the task, it is clear that there exists a need in the art for a tool that can facilitate the rapid hanging of fence boards with less effort than has heretofore been possible.

SUMMARY OF THE INVENTION

Accordingly, it is a primary object of the present invention to provide an apparatus for facilitating the rapid mounting of fence boards to fence posts.

It is also a primary object of the present invention to provide an apparatus for facilitating the rapid mounting of fence boards to fence posts by only one individual.

Another primary object of the present invention to provide an apparatus for facilitating the rapid mounting of fence boards to fence posts with less physical effort than is required by manually holding boards in place for mounting to posts.

It is also an object of the subject invention to provide an apparatus for facilitating the rapid mounting of fence boards to fence posts at spacing distances preselected by the user such that the same apparatus can be used for the erection of, for example, 3-board, 4-board or 5-board fencing.

Still another object of the subject invention is to provide fence board installation aid that is capable of rapid construction at a relatively low cost.

Yet another object of the subject invention is to provide a fence board installation aid that is simple in design, relatively light weight and easy to use.

These together with other objects of the invention, along with the various features of novelty which characterize the invention, are pointed out with particularity in the claims annexed to and forming a part of this disclosure, and will become readily apparent to those skilled in the art upon consideration of the drawings and detailed description below.

By way of summary, the above recited objects of the present invention, as well as others, are obtained by the provision of an apparatus for facilitating the rapid mounting of fence boards to fence posts. According to one embodiment of the present invention there is provided an adjustable fence board installation aid comprising: 1) a rail having a tongue projecting perpendicularly from one end thereof; and 2) a board support assembly slidably disposed on the rail, the board support assembly comprising: a) a carriage slidably mounted on the rail, b) a carriage lock for selectively fixing the carriage at a desired location along the rail, and c) a hook depending from the carriage below the tongue for temporarily supporting one end of a board to be mounted to a post; whereby the subject apparatus may be hung from a first fence board by the tongue and then used to support an end of a second fence board within the cradle a desired distance below, and in substantially coplanar alignment with, the first board for mounting to a post. In certain embodiments, the rail is ruled to facilitate the rapid location of the board support assembly the desired distance from the tongue so that the board to be mounted can be spaced the desired distance from the board above it. In certain embodiments, at least one handle is mounted to the bar to facilitate lifting of a fence board when disposed within the cradle.

In a more simplified embodiment of the present invention there is provided a fence board installation aid for facilitating the rapid mounting of a fence board to a fence post a predefined distance below an existing mounted fence board, the installation aid comprising a bar having a first end and a second end, a tongue projecting perpendicularly from the first end, and a board supporting cradle projecting perpendicularly from the second end, the tongue and board supporting cradle being in radial alignment and spaced apart a predetermined distance; whereby the subject apparatus may be hung from a first fence board by the tongue and then used to support an end of a second fence board within the cradle a preset distance below, and in substantially coplanar alignment with, the first fence board for mounting to a post. In certain embodiments, at least one handle is mounted to the bar to facilitate lifting of a fence board when disposed within the cradle.

There has thus been outlined, rather broadly, the more important components and features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the included abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is front elevation view of the adjustable fence board installation aid of FIG. 1;

FIG. 3 is left side elevation view of the adjustable fence board installation aid of FIG. 1;

DETAILED DESCRIPTION OF THE PREFERRED EMBODIMENT

Figure 1:
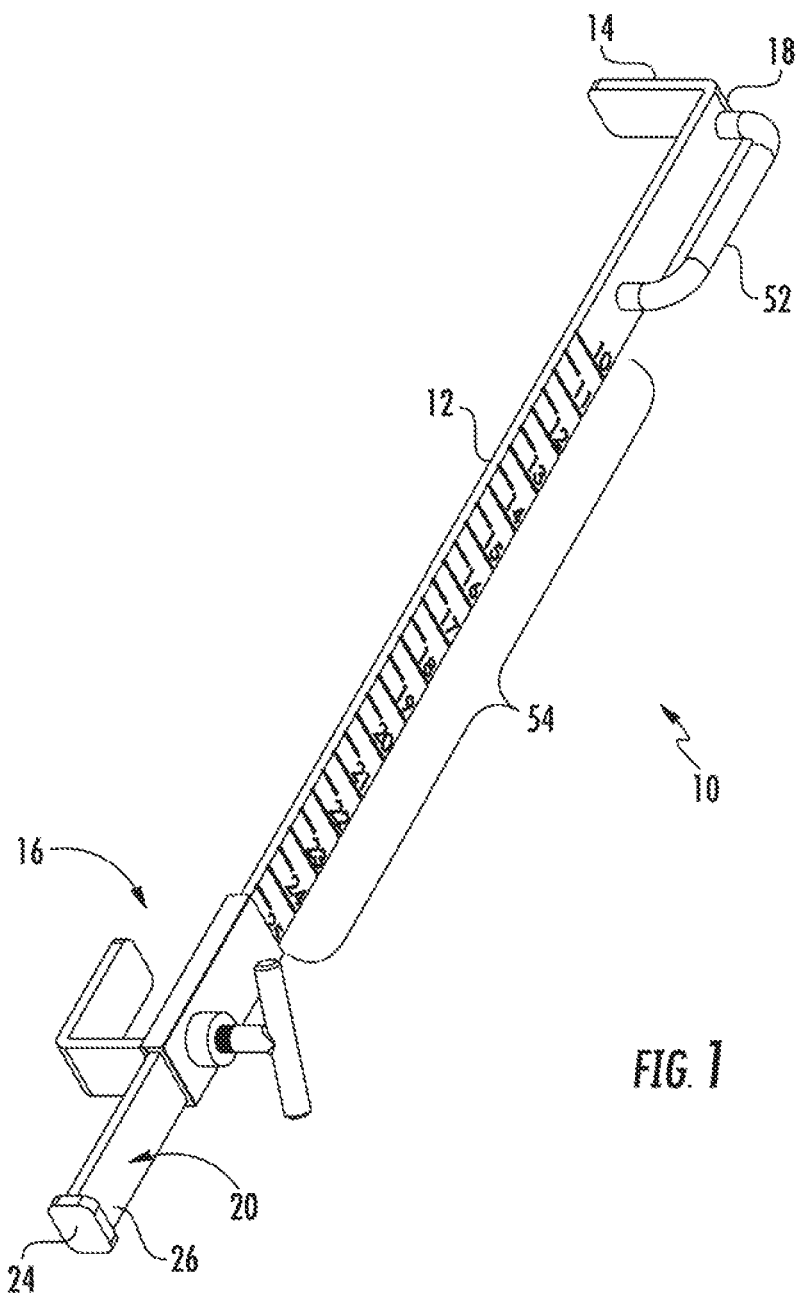
FIG. 1 is a front perspective view of an adjustable fence board installation aid of the subject invention.

It should be clearly understood at the outset like reference numerals are intended to identify the same structural elements, portions or surfaces consistently throughout the several drawings herein, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. It should also be noted that in order to promote clarity and ease of understanding by the reader, or merely for ease of illustration, the figures are not drawn to scale and the proportions of certain parts have been exaggerated from one figure to the next. As used in the following description, any reference to terms of orientation such as "horizontal", "vertical", "front", "rear", "left", "right", "up", "down", "inward" or "outward", "proximate", "distal", as well as adjectival and adverbial derivatives thereof (e.g., "horizontally", "vertically", "forwardly", "rearwardly", "leftward", "rightward", "upward", "downward", "inwardly" or "outwardly"), generally refer to the orientation of a surface or structure relative to its axis of elongation, or axis of rotation, as appropriate. One of ordinary skill in the art will also appreciate that a component may be designed as multiple components or that multiple components may be designed as a single component.

Before describing the construction of the various embodiments of the subject fence board installation aid, it is helpful to understand the general layout of a conventional post and board (aka "post and rail") fence. Board fence is usually a 3 or 4 board layout using treated wooden posts, either round, half round, square or rectangular in section, and 6-8 feet in length depending on the desired depth of insertion into the ground and height above ground. Horizontal fence rails are typically 1-inch-by-6-inch-by-16-foot boards. Each 16-foot-long rail will span three posts, but rails are typically staggered top to bottom so they don't always begin and end on the same posts. Normal finished height is 48 inches, but a 4 board "post and rail" fence can be stretched up to 5 ft. tall without it looking odd. The distance between rails should be uniform and will depend on the number of rails being used. A gap of approximately 8-10 inches is typical for a 3-board fence, and a gap of approximately 6-8 inches is typical for a 4-board fence.

As previously stated, because of their 16 foot length, it is impossible for an individual to hold one end of the board in place while simultaneously fastening the opposite end to a post. The subject apparatus provides a means for temporarily supporting one end of a rail against a post to which it will be mounted a desired distance below a mounted rail so that the installer is free to attend to other tasks such as mounting the opposite end of the rail to a post, or securing its midsection to an intervening post.

Figure 11:
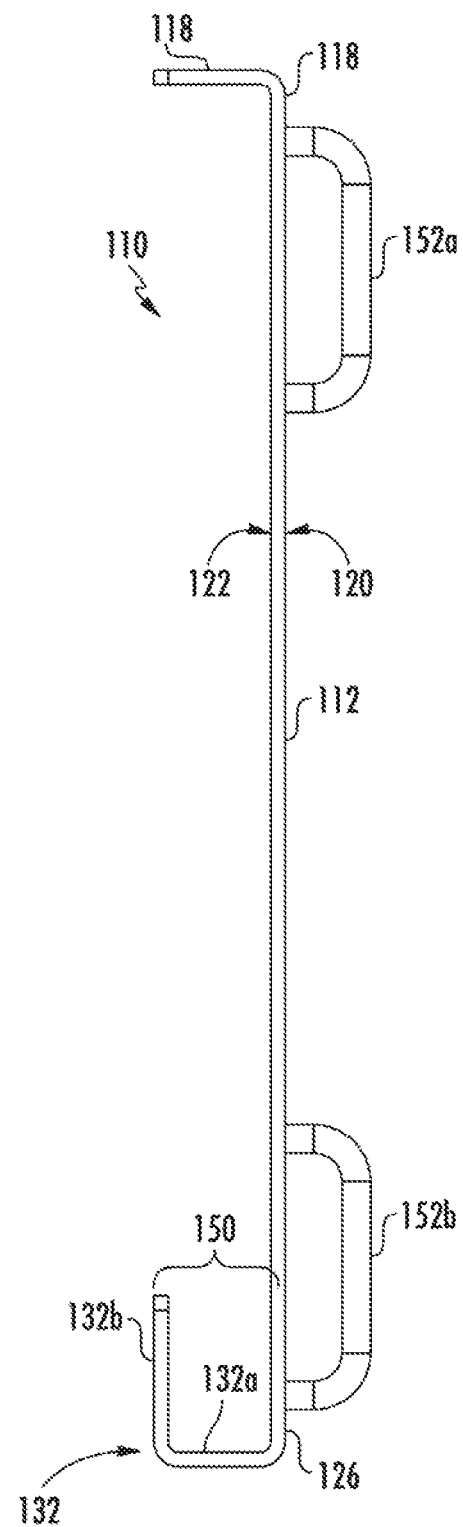
FIG. 11 is left side elevation view of the fence board installation aid of FIG. 9.
Figure 12:
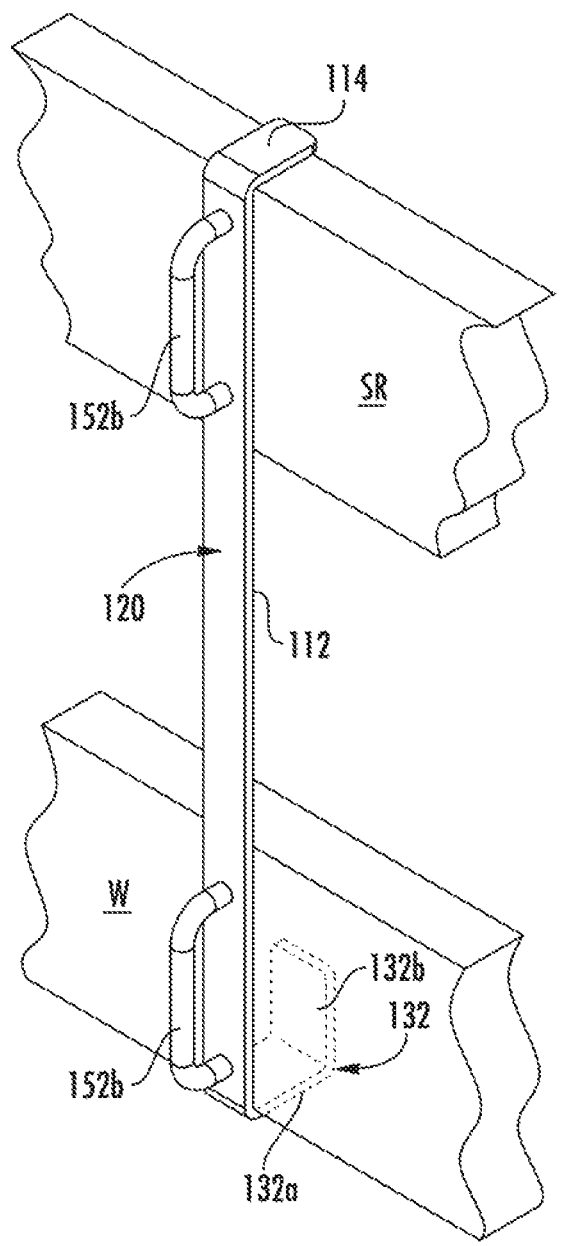
FIG. 12 is a perspective view of a fixed length fence board installation aid of the subject invention shown suspended from a mounted fence board and supporting a board to be mounted to a post.

With reference now being made to FIGS. 1-3, a first embodiment of an adjustable fence board installation aid of the subject invention is identified generally by reference numeral 10 (also referred to herein as the "subject apparatus 10" or merely as "apparatus 10"). All embodiments of the subject invention are used to temporarily support one end of a board to be mounted (hereinafter referred to as "workpiece W"; see FIGS. 7 and 11) a desired distance below a previously mounted rail (hereinafter the "support rail SR"; see again FIGS. 7 and 11). Adjustable fence board installation apparatus 10 comprises a rail 12 having a tongue 14 projecting perpendicularly from a first end 18 of rail 12, and a board support assembly 16 slidably disposed on rail 12. Rail 12 and tongue 14 may be integrally formed such as from bending a metal bar, or may be separate components fixedly joined together such as via welding or other common methods of union. In a preferred embodiment, rail 12 and tongue 14 are constructed of a single bar of 1¼ inch wide 1000 series cold rolled steel, but other materials may also be utilized such as other metals, alloys, woods and plastics, for instance. In a preferred embodiment rail 12 has a length equal to or greater than 24 inches which is sufficient to span the width of two fence boards plus the desired gap therebetween. For example, the width of a common fence board is 5½ to 6 inches and the gap between rails of a 3-board or 4-board post and rail fence is typically no greater than 12 inches for a total span of between 23 and 24 inches. Rail lengths ranging from 18 inches to four feet are contemplated, however. In certain embodiments, tongue 14 is at least equal to the thickness of the fence board upon which it will be mounted as described below, but preferably no greater than three times the thickness of the fence board. In a preferred embodiment, tongue 14 is approximately 3 inches in length but can range from a minimum of 1 inch to a maximum of 5 inches. Some lengths outside of this range may still function, but not ideally. In preferred embodiments, rail 12 is rectangular in shape having a front face 20 and a rear face 22. Rail 12 terminates in carriage stop 24 which may be permanently mounted to second end 26 of rail 12 for retaining board support assembly thereon.

Figure 4:
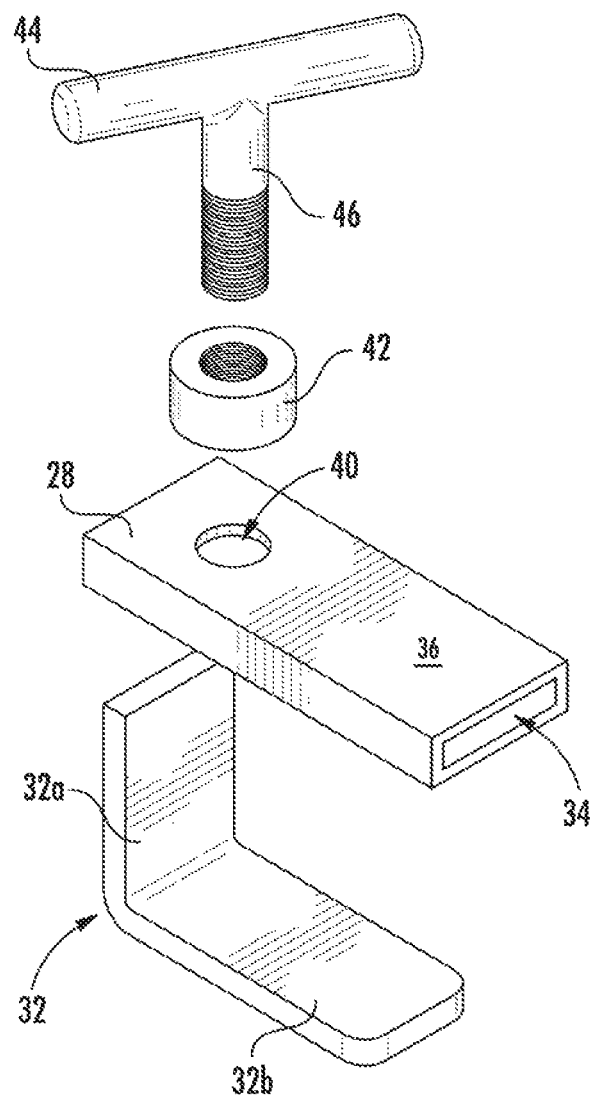
FIG. 4 is an exploded view of a fence board support assembly of the subject invention.
Figure 5:
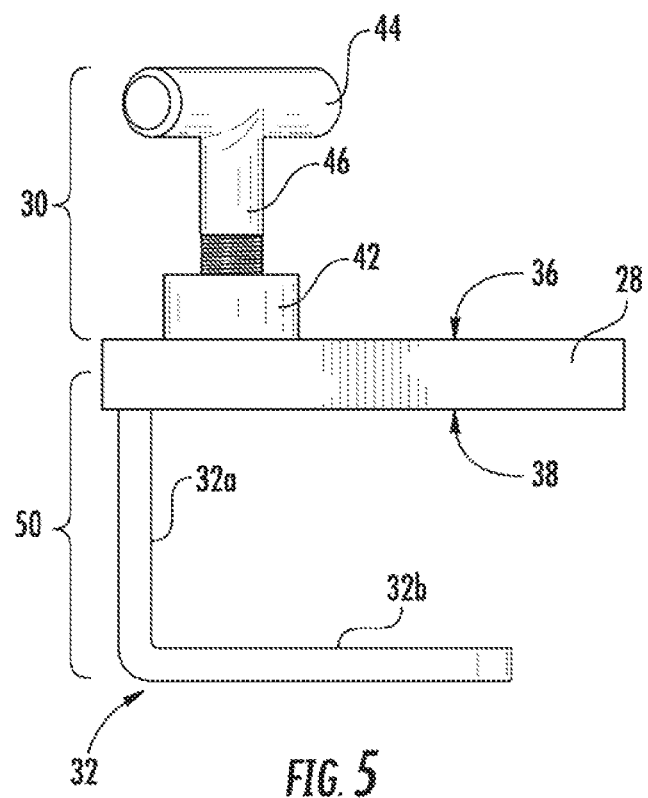
FIG. 5 is a side elevation view of the fence board support assembly of FIG. 4.
Figure 6:
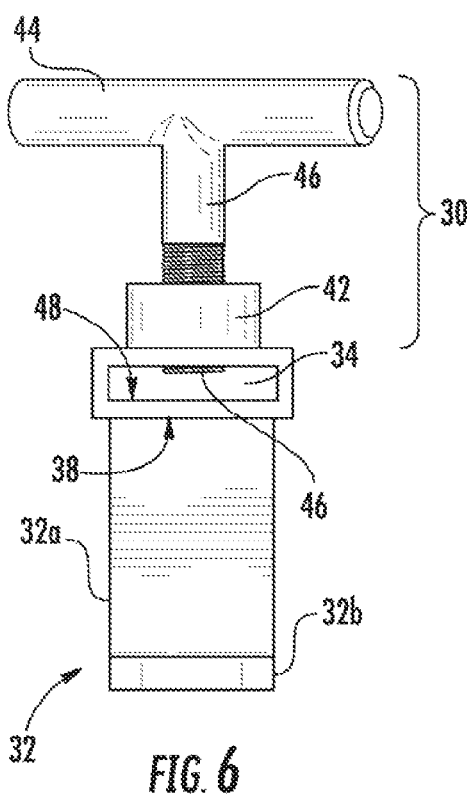
FIG. 6 is an end view of the fence board support assembly of FIG. 4.
Figure 7:
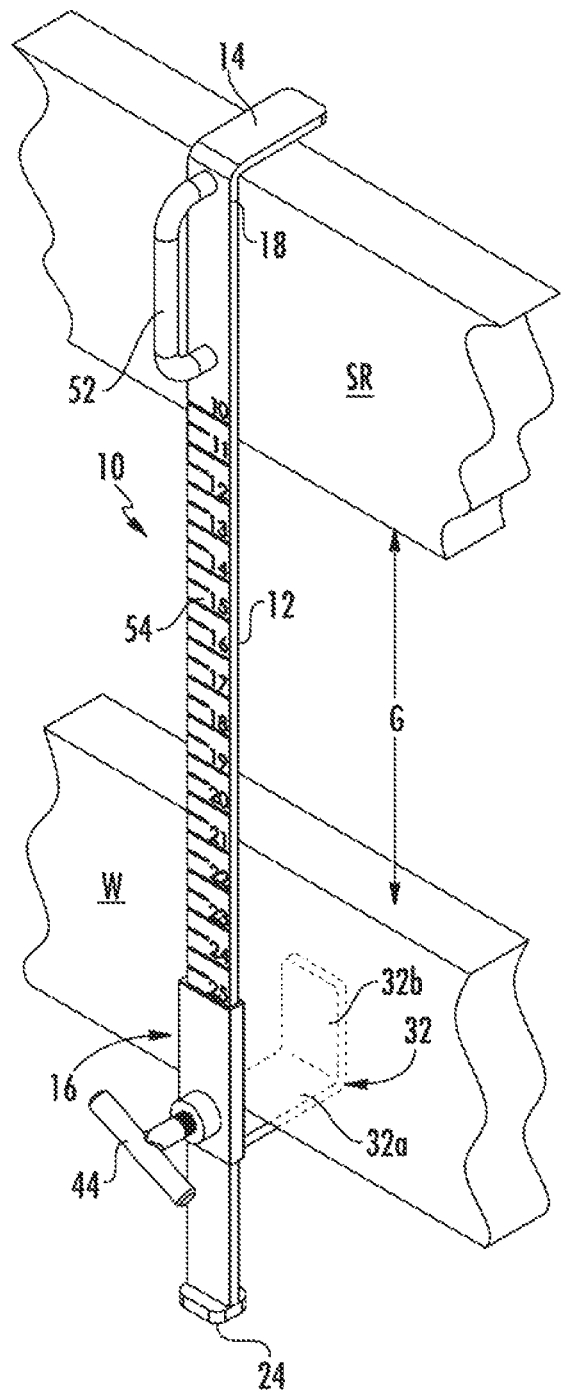
FIG. 7 is a perspective view of an adjustable fence board installation aid of the subject invention shown suspended from a mounted fence board and supporting a board to be mounted to a post.

Reference now being made to FIGS. 4-6, board support assembly 16 is comprised of a carriage 28 slidably mounted on rail 12, a carriage lock 30 operably mounted to carriage 28 for selectively fixing the carriage at a desired location along the longitudinal axis of rail 12, and a hook 32 depending from carriage 28 below tongue 14 for temporarily supporting one end of a workpiece W (FIG. 7). Tongue 14 and hook 32 depend from rail 12 along parallel axes. In certain embodiments, carriage 28 is comprised of an open-ended sleeve having an opening 34 sized and shaped for slidable engagement with rail 12 along its longitudinal axis. As may be appreciated, once carriage 28 is mounted on rail 12, carriage stop 24 may be fixedly attached to second end 26 such as by welding in order to prevent removal of carriage 28 from the rail. In a preferred embodiment, carriage 28 is rectangular in shape having a front surface 36 and a back surface 38. An aperture 40 is disposed through carriage 28 generally, and through front surface 36 thereof in particular, in communication with opening 34. In certain embodiments, carriage lock 30 is comprised of a threaded protuberant boss 42 centered about aperture 40 and projecting outwardly from front surface 36 of carriage 28, and a lock handle 44, preferably but not essentially T-shaped, and including a cylindrical stem 46 at least a portion of which is sized and reciprocally threaded for rotational engagement with boss 42. As should be apparent to those reasonably skilled in the art, tightening of handle 44 causes its stem 44 to pass through aperture 40 into contact with rail 12 urging it against the opposing interior wall 48 in clamping engagement thereby preventing movement of carriage 28. Other forms of carriage locks may also be employed without departing from the spirit of the subject invention. For example, and without limitation, a spring-loaded device can be used to temporarily hold carriage 28 in position at a desired location along the longitudinal axis of rail 12. Such devices use the force in the spring to apply pressure so that a ball or nose of a pin will remain nested in holes or detents incrementally spaced along at least a portion of rail 12. Indexing plungers, ball plungers, hand-retractable spring plungers may be employed. Indexing, spring and ball plungers and their accessories are also referred to as: spring loaded devices, detent pins, hand retractable pins, buspring loaded pins, button handle pins, shackle pins, locating pins, indexing pins, retracting pins, spring loaded pins, receptacles and lanyards, rapid release pins, t-handle release pins, ball chains, self-locking rapid release pins, side thrust pins, thrust pins, spring loaded shells, ball buttons, spring loaded positioning elements, hand retractable spring plungers, lockout spring plungers, non-lock-out plungers, and spacer bushings. Clamping devices are also contemplated.

Hook 32 is comprised of a base member 32a projecting perpendicularly from, and in fixed engagement with, back surface 38 of carriage 28, and arm 32b depending perpendicularly from base member 32a, upwardly in the direction of tongue 14 and in parallel with rail 12. The back surface 38 of carriage 28 together with hook 32 form a C-shaped cradle 50 for receiving, supporting and retaining therein a fence board. In certain embodiments, a fixed handle 52 is permanently mounted to rail 12 in proximity to its first end 18, opposite tongue 14. Handle 14 may be used for carrying apparatus 10 generally, to facilitate lifting of a workpiece W when mounted within cradle 50, and to accomplish removal of apparatus 10 from the support rail SR as discussed below. In addition to rail 12 and tongue 14, each of the above described components of apparatus 10 may be made of metal, metal alloys or plastics. In certain embodiments, a 1000 series cold rolled steel is the preferred material of construction with the components being powder coated for protection.

Referring now to FIG. 7, the setting of carriage 28 along rail 12 in order to achieve the desired gap G between an existing support rail SR and the workpiece W to be mounted thereunder must first be accomplished. In cases where the gap G distance is already known, such as when a section of fence with the desired spacing already exists, apparatus 10 may first be hung by its tongue 14 on the top edge of an existing support rail SR such that rail 12 depends downwardly therefrom across the support rail SR, the gap G between the two boards, and the board below the support board. Fence board support assembly 16 may then be moved axially along rail 12 from a position below the bottom board upwardly until hook 32 engages the bottom edge of the bottom board. Thusly positioned, carriage lock 30 may then be engaged to fix the position of support assembly 16 on rail 12. In certain embodiments, rail 12 includes a rule 54 located along at least a portion of its longitudinal axis comprising incrementally spaced markings, including sequential digits and hash marks, which serve as reference points for the location of support assembly 16 generally, and carriage 28 in particular, on rail 12. As should be readily appreciated, once the position of carriage 28 relative to a particular marking is known it can be noted by the user for future reference. Once carriage 28 has been set at the desired location along rail 12, one end of the workpiece W may then be place in cradle 50 and lifted into position for mounting by hanging apparatus 10 on the top edge of an existing support rail SR as described above. Note that the arrangement of tongue 14 and hook 32 relative to rail 12 causes the workpiece W to be oriented in coplanar alignment under the support rail SR when apparatus 10 is suspended from the latter. Thusly positioned, the workpiece may now be secured to its posts with the desired gap G between it and the above support rail. Once the workpiece has been mounted, it too can now serve as a support rail for workpieces to be mounted thereunder. As may be appreciated, the subject fence board installation aid 10 facilitates the rapid mounting of rails even when only one installer is performing the task.

Figure 8:
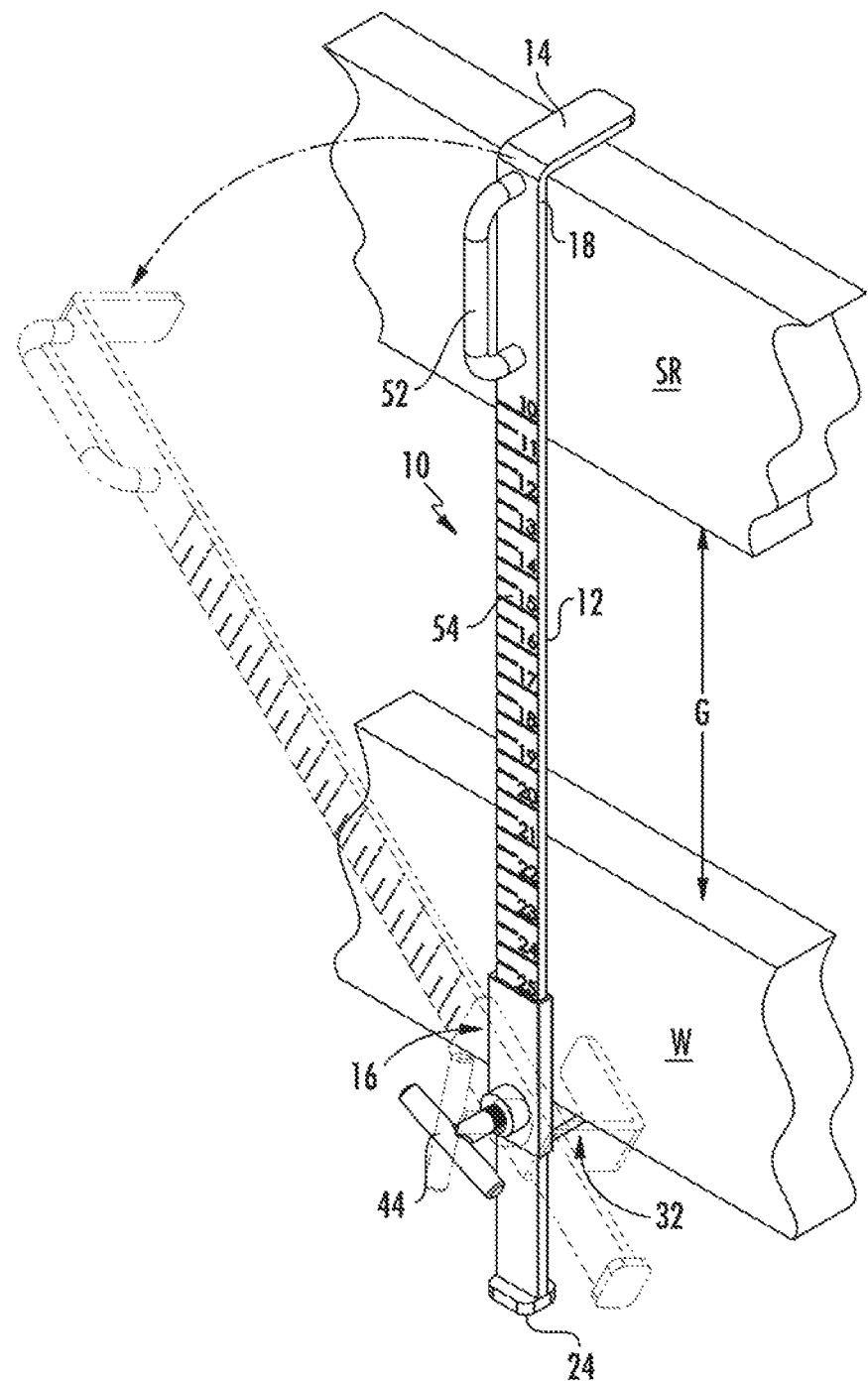
FIG. 8 illustrates the removal of the fence board installation aid of FIG. 7.
Figure 9:
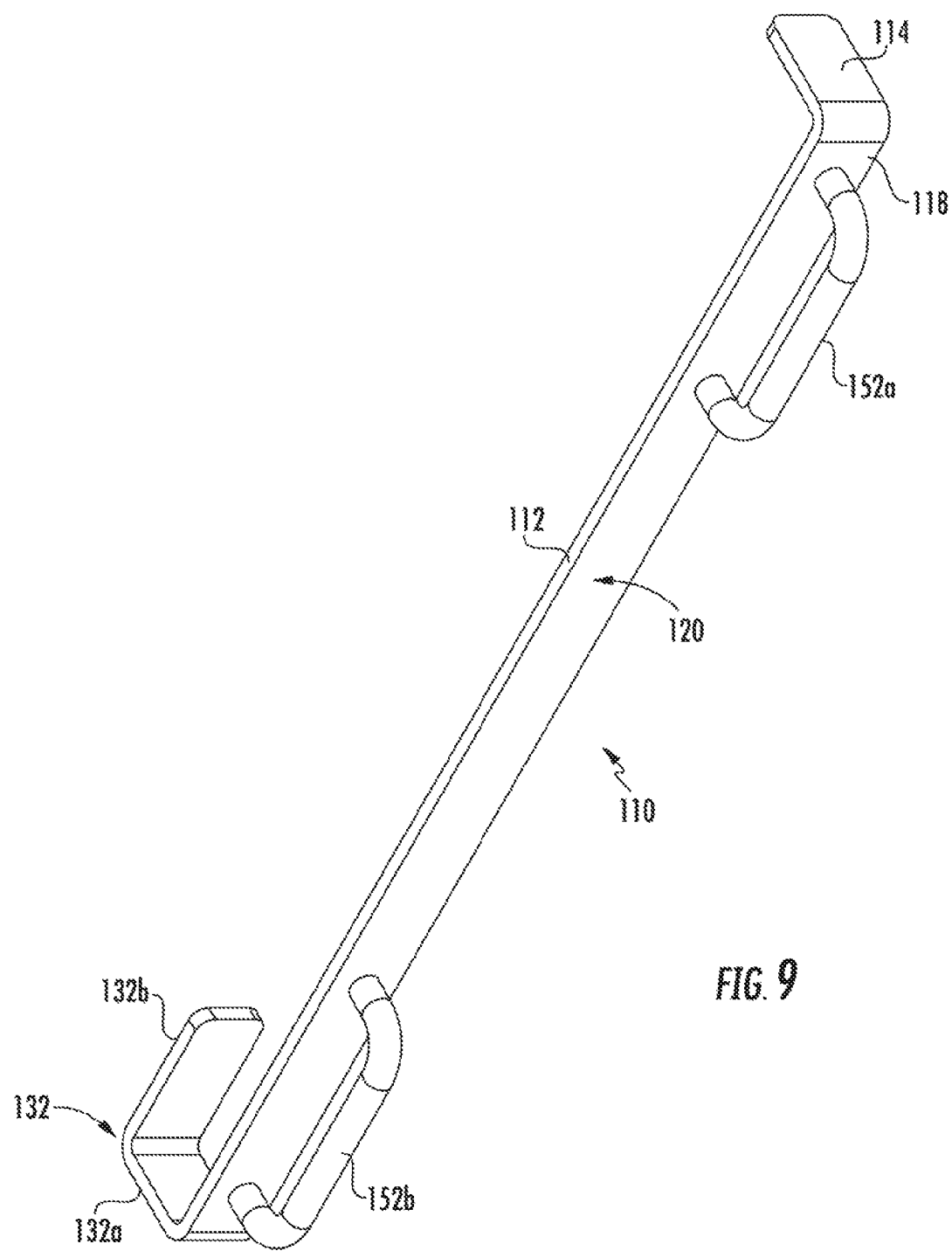
FIG. 9 is a front perspective view of a fixed length fence board installation aid of the subject invention.
Figure 10:
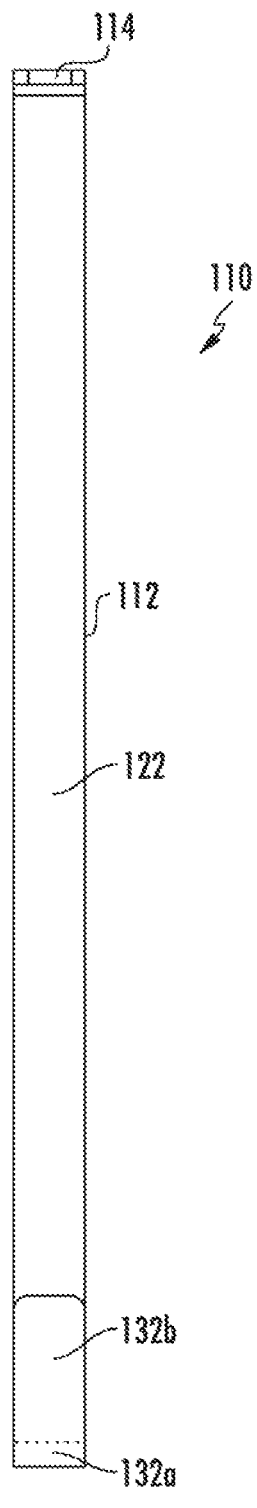
FIG. 10 is rear elevation view of the fence board installation aid of FIG. 9.

With continued reference to FIG. 7, once a workpiece W has been mounted and is, therefore, no longer capable of being lifted out of cradle 50, apparatus 10 must be removed from it rather than vice versa. The shape, sizing and orientation of tongue 14 and cradle 50 are important factors in accomplishing removal of apparatus 10 with ease. While it would certainly be possible to merely disengage carriage lock 30 and slide board support assembly 16 downwardly along rail 12 until hook 32 is clear of the now mounted workpiece W, this method is undesirable because it would require repeated relocation of the support assembly 16 which would slow the installation process. Instead, apparatus 10 may be removed by pivoting first end 18 away from support rail SR as depicted in FIG. 8. In order that this method may be accomplished without relocation of board support assembly 16, it is first important that tongue 14 not include any downwardly depending (i.e., in the direction of cradle 50) appendage that could inhibit pivoting of apparatus 10 or removal of tongue 14 from support rail SR. Additionally, it is important that base member 32a of hook 32 has a length greater than the thickness of the fence board to be mounted such that the workpiece has freedom of movement when disposed in cradle 50 thus permitting tongue 14 to pivot free of the support rail. Accordingly, a base member length approximately 1.5 to 2.5 times greater than the thickness of the workpiece is preferred. For example, a base member length of between approximately 1½ to 2½ inches is suitable for a standard 1-inch thick fence board, with a base member length of 2 inches being preferred. It is also important that the length of hook arm 32b be sufficient to prevent the workpiece from toppling over out of cradle 50, but not so long as to inhibit tongue 14 from pivoting clear of the support rail upon which it is mounted. Accordingly, a hook arm length of approximately 40-60% of the width of the workpiece is preferred. For example, a hook arm length of between approximately 2½ to 3½ inches is appropriate for use with a standard 6-inch wide fence board, with a hook arm length of 3 inches being preferred.

Referring now to FIGS. 9-12, a simplified embodiment of the present invention designated generally by reference numeral 110 is comprised of a bar 112 having a first end 118, a second end 126, a front face 120, a rear face 122, a tongue 114 projecting perpendicularly from rear face 122 at or in close proximity to first end 118, and a board supporting hook 132 projecting perpendicularly from rear face 122 at or in close proximity to second end 126. Tongue 114 and hook 132 project outwardly from bar 112 along parallel radial axes and are spaced apart a predetermined distance from one another. Bar 112 and tongue 114 may be integrally formed such as from bending a metal bar, or may be separate components fixedly joined together such as via welding or other common methods of union. Bar 112 and hook 132 may be similarly constructed in either fashion. In a preferred embodiment, bar 112, tongue 114 and hook 132 are constructed of a single bar of 1¼ inch wide 1000 series cold rolled steel, but other materials may also be utilized such as other metals, alloys, woods and plastics, for instance.

In a preferred embodiment bar 112 has a length equal to or greater than 24 inches which is sufficient to span the width of two fence boards plus the desired gap therebetween. For example, the width of a common fence board is 5½ to 6 inches and the gap between rails of a 3-board or 4-board post and rail fence is typically no greater than 12 inches for a total span of between 23 and 24 inches. Lengths ranging from 18 inches to four feet are contemplated, however. In certain embodiments, tongue 114 has a length greater than or equal to the thickness of the fence board upon which it will be mounted as described below. In a preferred embodiment, tongue 114 is approximately 3 inches in length but can range from a minimum of 1 inch to a maximum of 5 inches. Lengths outside of this range may still function, but not ideally.

Hook 132 is comprised of a base member 132a projecting perpendicularly from, and in fixed engagement with, rear face 122 of bar 112, and arm 132b depending perpendicularly from base member 132a, upwardly in the direction of tongue 114 and in parallel with rail 112. Together, a lower portion of bar 112 and hook 132 form a C-shaped cradle 150 for receiving, supporting and retaining therein a fence board. In certain embodiments, a first fixed handle 152a is permanently mounted to the front face 120 of bar 112 in proximity to its first end 118, opposite tongue 114. In certain embodiments, a second fixed handle 152b is permanently mounted to the front face 120 of bar 112 in proximity to its second end 126, opposite hook 132. Handles 152a,b may be used for carrying apparatus 110 generally, to facilitate lifting of a workpiece W when mounted within cradle 150, and to accomplish removal of apparatus 110 from the support rail SR. As may be readily appreciated, fixed length embodiments of the subject fence board installation aid are employed for hanging fence boards a predetermined distance below the support rail.

Removal of fixed length embodiments from the support rail SR and underlying workpiece W is accomplished via the same pivoting motion described above in reference to FIG. 8. Once again, in order that this may be accomplished, it is first important that tongue 114 not be hook shaped such that any downwardly facing appendage would be hung up on the support rail SR and prevent pivoting of apparatus 110. Additionally, it is important that base member 132a of hook 132 has a length greater than the thickness of the fence board to be mounted such that the board has freedom of movement when disposed in cradle 150. By way of example, a base member 132a having a length of approximately 2 inches would be appropriate for a workpiece having a thickness of one inch. Accordingly, a base member length of approximately 150-200% of the thickness of the workpiece is preferred. It is also important that the length of hook arm 132b be sufficient to prevent the workpiece from toppling over out of cradle 150. For example, a hook arm 132b length of approximately 3 inches is preferred for use with a standard 6-inch wide fence board. Accordingly, a hook arm length of approximately 40-60% of the width of the workpiece is preferred.

Although the present invention has been described with reference to the particular embodiments herein set forth, it is understood that the present disclosure has been made only by way of example and that numerous changes in details of construction may be resorted to without departing from the spirit and scope of the invention. Thus, the scope of the invention should not be limited by the foregoing specifications, but rather only by the scope of the claims appended hereto.

What is claimed as being new, useful and desired to be protected by Letters Patent of the United States is as follows:

1. A fence board installation aid for temporarily supporting a first fence board having a length, a width and a thickness, in co-planar alignment with, and at a spaced distance below, a horizontally mounted fence board, the fence board installation aid comprising:
   a. a bar having a first end, a second end, a front face and a rear face;
   b. a tongue projecting perpendicularly from said rear face of said bar at said first end of said bar; and
   c. a board support hook projecting perpendicularly from said rear face of said bar at said second end of said bar; said tongue and said hook projecting outwardly from said bar along parallel radial axes and being spaced apart a predetermined distance from one another; said tongue and said hook being arranged to support the first fence board in co-planer alignment with, and at a spaced distance below, the horizontally mounted fence board when said tongue is mounted on top of the horizontally mounted fence board.

2. The fence board installation aid of claim 1, wherein said hook comprises a base member and an arm, said base member being perpendicular to said bar, said arm being perpendicular to said base member and depending upwardly in the direction of said tongue in parallel with said bar.

3. The fence board installation aid of claim 2, wherein said base member has a length of approximately 1.5 to 2.0 times greater than the thickness of the first fence board, and said arm has a length of approximately 40-60 percent of the width of the first fence board such that the first fence board has freedom of movement when disposed in said hook thus permitting said tongue to pivot free of the horizontally mounted fence board.

4. The fence board installation aid of claim 3, further including at least one handle attached to said front face of said bar.

5. The fence board installation aid of claim 2, further including at least one handle attached to said front face of said bar.

6. The fence board installation aid of claim 1, further including at least one handle attached to said front face of said bar.

7. An adjustable fence board installation aid for temporarily supporting a first fence board having a length, a width and a thickness, in co-planar alignment with, and at an adjustable spaced distance below, a horizontally mounted fence board, the fence board installation aid, comprising:
   a. a rail having a first end, a second end and a longitudinal axis;
   b. a tongue projecting perpendicularly from said longitudinal axis at said first end of said rail; and
   c. a fence board support assembly selectively positioned along said longitudinal axis of said rail, said fence board support assembly comprising: i) a carriage slidably mounted on said rail; ii) a carriage lock operably mounted to said carriage for selectively fixing said carriage to said rail a desired distance from said tongue; and iii) a hook depending from said carriage; said tongue and said hook depending from said carriage along parallel radial axes; said tongue and said hook being arranged to support the first fence board in co-planer alignment with, and at a spaced distance below, the horizontally mounted fence board when said tongue is mounted on top of the horizontally mounted fence board.

8. The adjustable fence board installation aid of claim 7, wherein said hook comprises a base member and an arm, said base member being perpendicular to said rail, said arm being perpendicular to said base member and depending upwardly in the direction of said tongue and parallel to said longitudinal axis.

9. The adjustable fence board installation aid of claim 8, wherein said base member has a length of approximately 1.5 to 2.5 times greater than the thickness of the first fence board, and said arm has a length of approximately 40-60 percent of the width of the first fence board such that the first fence board has freedom of movement when disposed in said hook thus permitting said tongue to pivot free of the horizontally mounted fence board.

10. The adjustable fence board installation aid of claim 9, further including a handle attached to said rail.

11. The adjustable fence board installation aid of claim 9, further including carriage stop mounted to said rail for retaining said fence board support assembly thereon.

12. The adjustable fence board installation aid of claim 9, wherein said rail includes a rule located along at least a portion of said longitudinal axis.

13. The adjustable fence board installation aid of claim 8, further including a handle attached to said rail.

14. The adjustable fence board installation aid of claim 8, further including carriage stop mounted to said rail for retaining said fence board support assembly thereon.

15. The adjustable fence board installation aid of claim 8, wherein said rail includes a rule located along at least a portion of said longitudinal axis.

16. The adjustable fence board installation aid of claim 7, further including a handle attached to said rail.

17. The adjustable fence board installation aid of claim 16, further including carriage stop mounted to said rail for retaining said fence board support assembly thereon.

18. The adjustable fence board installation aid of claim 16, wherein said rail includes a rule located along at least a portion of said longitudinal axis.

19. The adjustable fence board installation aid of claim 7, further including carriage stop mounted to said rail for retaining said fence board support assembly thereon.

20. The adjustable fence board installation aid of claim 7, wherein said rail includes a rule located along at least a portion of said longitudinal axis.

* * * * *